United States Patent
Abelbeck et al.

[11] Patent Number: 5,988,671
[45] Date of Patent: Nov. 23, 1999

[54] COLLAPSIBLE CART

[75] Inventors: Kevin G. Abelbeck, Venice, Calif.;
Paul C. Dickie, Loveland, Colo.;
James D. Thrasher, 12 Kathryn Rd., Foxboro, Mass. 02035; Perry M. DiMascio, 20 Douglas Dr., Mansfield, Mass. 02048

[73] Assignees: James D. Thrasher, Foxborough; Perry M. DiMascio, Mansfield, both of Mass.

[21] Appl. No.: 08/968,572

[22] Filed: Nov. 12, 1997

Related U.S. Application Data

[63] Continuation-in-part of application No. 08/806,339, Feb. 26, 1997, Pat. No. 5,915,722.

[51] Int. Cl.[6] .................................................. B62B 1/00
[52] U.S. Cl. ............................................................ 280/649
[58] Field of Search .............................. 280/35, DIG. 6, 280/638, 639, 651, 652, 654, 655, 659, 37, 47.17, 47.18, 47.24, 47.26, 47.315, 649, DIG. 3; 180/129, 132; 206/216, 335; 211/85, 132, 195; 248/129; D34/24

[56] References Cited

U.S. PATENT DOCUMENTS

| | | | |
|---|---|---|---|
| 3,627,342 | 12/1971 | Morellet | 280/649 |
| 3,677,571 | 7/1972 | Maturo, Jr. et al. | 280/36 R |
| 3,693,993 | 9/1972 | Mazzarelli et al. | 280/30 |
| 4,222,585 | 9/1980 | Crothers | 280/654 |
| 4,266,807 | 5/1981 | Griffin | 280/649 |
| 4,429,897 | 2/1984 | Friedman et al. | 280/646 |
| 4,703,944 | 11/1987 | Higson | 280/30 |
| 4,790,559 | 12/1988 | Edmonds | 280/655 |
| 4,865,346 | 9/1989 | Carlile | 280/654 |
| 4,887,837 | 12/1989 | Bonewicz, Jr. et al. | 280/654 |
| 5,197,754 | 3/1993 | Ward | 280/655 |

*Primary Examiner*—Christopher P. Schwartz
*Assistant Examiner*—S. T. Bartz

[57] ABSTRACT

The disclosed invention is a means of transporting items such as those commonly taken to the beach or on a picnic over sandy or otherwise yielding terrain. The device is comprised of a wheeled, collapsible frame including a bottom frame suitable for supporting larger objects such as an ice chest. The disclosed invention also includes an upper frame which supports a pliable receptacle that is of sufficient size to hold a multitude of miscellaneous items such as blankets, beach toys, clothes, food, etc. The invention includes a retractable chair hanger to support a plurality of folding chairs in a hanging fashion thereby providing a stable environment for transporting the chairs with little risk of loosing the chairs when traveling over rough terrain. In the preferred embodiment, near the midpoint of the chair hanger is a cross bar that is used to support the front portion of the receptacle. The frame is such that it allows foldability to such an extent that it collapses to a size that can be easily stored and transported. This is aided by the use of a stop bracket. The stop bracket is preferably a spring loaded device that allows both locking of the front leg to the distal end of the handle and a pivotal attachment of the front leg to the handle.

7 Claims, 7 Drawing Sheets

COLLAPSIBLE CART

This is a continuation-in-part of Ser. No. 08/806,339, filed Feb. 26, 1997, U.S. Pat. No. 5,915,722.

BACKGROUND OF THE INVENTION

1. Field of the Invention

The invention herein relates to a collapsible hand propelled cart, and more particularly to an improved collapsible cart that is specially suited for moving objects over soft or otherwise yielding terrain such as sand at the beach.

2. Overview of Prior Art

A variety of art exists in the area of hand carts and even as it relates to beach travel, but all fall short of true functionality with respect to the end user. In U.S. Pat. No. 4,865,346 Carlile disclosed a wheeled collapsible cart assembly which includes a foldable lower frame, or bottom shelf, suitable for receiving an ice chest, and a pair of bracket arms extending behind the frame that could be used for placing folding chairs, but no receptacle is disclosed nor anticipated for transporting the many additional items taken to the beach such as blankets, toys, clothes, etc. In addition, the bracket arms are not practical because this storage means requires the chairs to sit on the horizontal portion of the arms. To move the cart the user pulls the handle back, tilting the device back and the chairs would easily fall out. This is exaggerated by the rough terrain this device is intended to travel over.

Carlile's disclosure shows a collapsible feature, but it is not without disassembly of the handle bar and the wheels. Removed parts are clumsy to transport and easily lost when the need to reassemble presents itself. The only functionally foldable portions are the bottom shelf and the bracket anrs, but since the latter is lacking in utility, folding has no true advantage. In addition, because this disclosure has the cooler chest as a part of the claimed invention, it does not accommodate the variety of sized and shaped existing coolers or ice chests that individuals already own, not to mention containers other than coolers, such as picnic baskets and the like.

The beach cart as disclosed by Maturo, Jr. et al. in U.S. Pat. No. 3,677,571 has a receptacle for storage of miscellaneous supplies and a hanger for a beach chair, but still falls short of optimal functionality. First, the chair hangers are useful only with the style of chair shown in this art, and even then only for the one chair. When such a device is to be used, it is expected that a larger group, such as one or more whole families, would be using the device and therefore multiple chairs would be needed. Second the folding feature consists of nothing more than collapsing the receptacle by the four bar linkage of the frame. The reduction in overall storage and transport size such as in the car, is minimal. Finally, the wheel as disclosed and claimed is a cylindrical shell with a series of annular members which are supported by a plurality of longitudinal wires. The resultant might provide increased traction if the device was driven by the cylindrical wheel, but it is driven by the handle. The lugged affect of the wheel only increases the rolling friction of the wheel as it is pulled across the sand making it more difficult to use than a smooth wheel that offers minimal work requirement of displacement of sand.

In a similar manner, Bonewicz, Jr. et al. in U.S. Pat. No. 4,887,837 disclosed a pair of wheels that included a plurality of elongated cleats. As previously mentioned, such cleats only inhibit the function of the product. Although the disclosed device does have a folding platform and a bag to store articles, the bag is lacking in a structural support to enable adequate size so as to be truly useful. The folding feature is limited to the support platform and as such does not fold sufficiently to be considered truly collapsible.

Edmonds' utility carrier, as disclosed in U.S. Pat. No. 4,790,559 does show a smooth wheeled foldable carrier for transporting items over terrain such as sand at the beach. The frame supports only an unyielding load box of a size that must match the frame. This could be used to store an ice chest or cooler or as a receptacle for other articles, but not both. It would not be obvious to add structure for transporting additional items such as beach chairs or items that would be stored in a bag such as towels, toys, etc. Though the folding feature does not necessitate disassembly, it is not collapsible and it remains bulky and cumbersome.

In U.S. Pat. No. 4,703,944, Higson disclosed a wheeled beach caddie in the form of a chair. The device does fold, but it does not collapse. The platform folds up to the back, but the folding does not functionally go beyond that point. In addition there is not a receptacle or bag to hold additional items of miscellaneous sizes and shapes. There is a "C-shaped chair rack" to hold beach chairs but if the chairs are positioned completely on top of the rack and supported against the back, the transported chairs would potentially be very unstable, especially while traversing uneven terrain, as with the Carlile patent. The chairs could be hung from the rack, placing them in stable equilibrium and making them more secure. If the chairs could be made to fit on this device, the bottom platform could not be used to store and transfer items, because the chairs would be in the way. It is not obvious to add structure to include a means for carrying a variety of items in a storage bag.

Another alternative design is disclosed in U.S. Pat. No. 4,429,897 by Friedman, et al. Therein the issue of a receptacle for containing miscellaneous items is not disclosed nor anticipated, neither is an additional structure for holding chairs. It does not disclose a folding feature but instead a "slidable, transversely extending back". A potential consideration with such a method includes problems with tolerance build up that can make such a telescoping device difficult to use or even non-functional. Also the environments in which such a device may be used could subject the device to dirt and sand. Such abrasives do not mix well with a telescoping structure because only a small amount of this particulate could cause an interference between such mating parts, making the parts no longer able to slide one on the other. The total size of the device would not be reduced like one that is optimally foldable, thus making it more difficult to store when not in use. Also, the disclosed thin wheels are not suited to traversing sand or other yielding terrain.

Other disclosures include Ward in U.S. Pat. No. 5,197,754 and Crothers in U.S. Pat. No. 4,222,585 where a wheeled cart is disclosed including a receptacle or bag to store miscellaneous items. No bottom frame or platform is disclosed, nor a method for transporting items such as beach chairs. Ward claims a rigid frame which constitutes minimal folding for storage. In a comparable manner, Crothers disclosed a folding of the device but not any breaking of the frame with additional folding features that would make it collapsible, thereby minimizing the needed storage space. Here as disclosed in much of the previous art, the wheels are not suited for traversing sand or other yielding terrain.

Mazzarelli et al. disclosed a beach tote cart in U.S. Pat. No. 3,693,993 which can be used as a cot or lounging chair. The disclosure claims a pair of frames pivotally attached, with a rolling cylinder. No collapsible feature is disclosed. A mesh pocket, or nylon fabric webbing panel, is claimed to be used for storage of items, but it must double as a seat back when the device is used as a lounge chair. This necessitates the capacity of the receptacle to be small in comparison to the size necessary to be truly functional. Also with such a design the items must be strapped in, as is disclosed. This results in an inconvenience to the user. If a supporting shelf or frame and bag type receptacle is made available, tie downs could many times be eliminated.

SUMMARY OF THE INVENTION

The object of the disclosed invention is to provide a means of transporting items in a convenient manner, such as those commonly taken to the beach or on a picnic. The device is comprised of a wheeled, collapsible frame work including a bottom frame suitable for supporting larger objects such as an ice chest. The disclosed invention also includes an upper frame which supports a pliable receptacle that is of sufficient size to hold a multitude of miscellaneous items such as blankets, beach toys, clothes, food or virtually anything else that would be considered common place at the beach or on a picnic with family and friends. The device also includes a retractable chair hanger to support a plurality of folding chairs in a hanging fashion thereby providing a stable environment for transporting the chairs with little risk of losing the chairs even when traveling over rough terrain. The frame allows foldability to such an extent that it collapses to a size that can be easily stored and transported.

DETAILED DESCRIPTION OF THE PREFERRED EMBODIMENT

Figure 1:
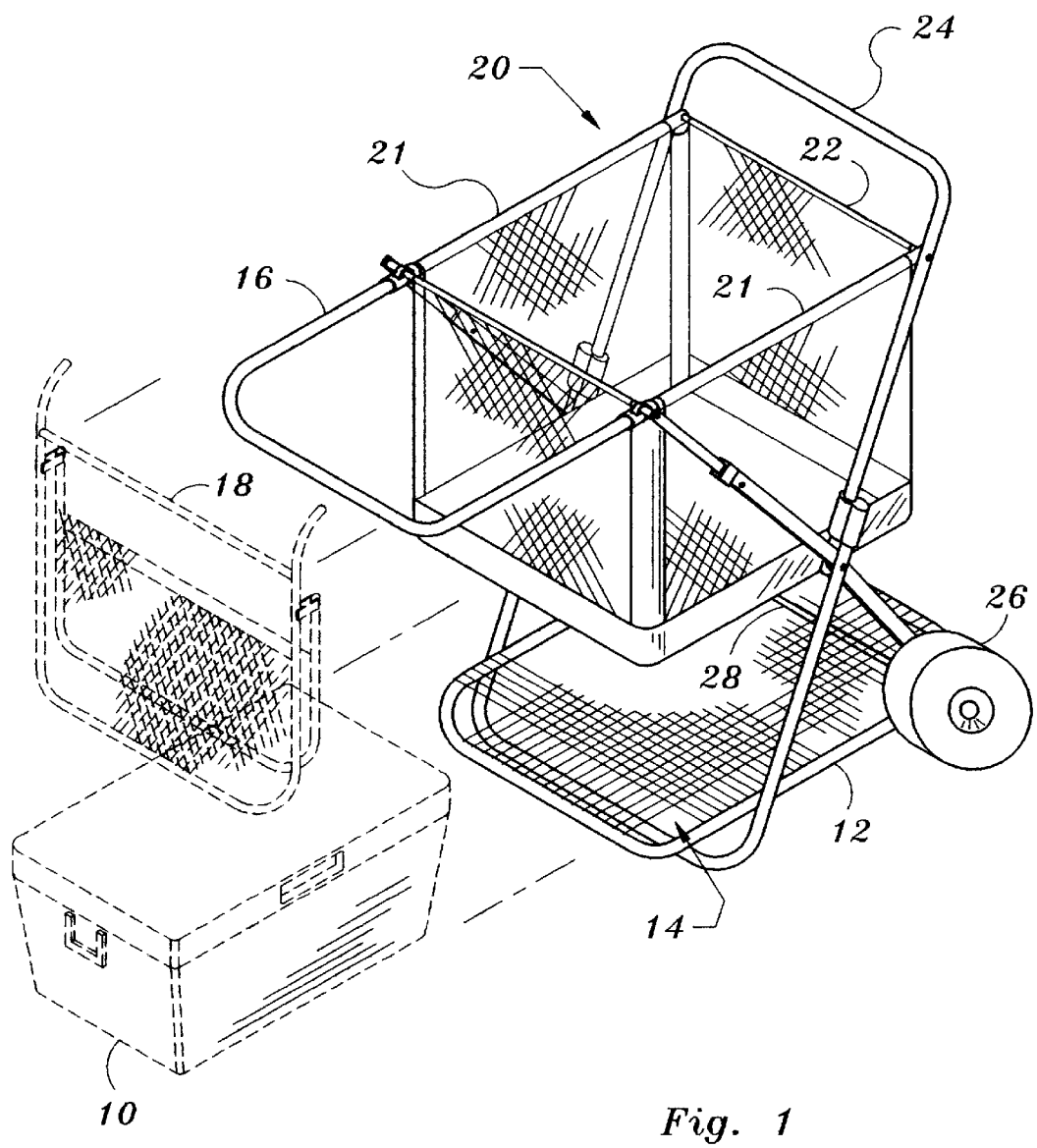
FIG. 1 is a prospective view of a collapsible cart produced in accordance with the preferred embodiment of the present invention and also accessories for transporting thereon.

Ever since the attraction of families to sea shores and other recreational areas, the problem of transporting the appropriate necessities has ensued. For example, often times, far off parking accompanied with long stretches of beach, make transporting items to the waterfront difficult at best. When the beach-goers plan to spend the day in the sand and surf, an array of accessories are necessary to accompany this journey. Beach towels, blankets, drinks, beach chairs, lotion, an umbrella, and a change of clothes are just some of the more common items. To transport such items a carrier or cart is necessary, such as is shown in FIG. 1. Herein is disclosed a wheeled cart suitable for transporting an item such as an ice chest 10 by placing it on a lower frame 12 of the cart. The lower frame 12 is shown here to be covered with a lightweight mesh material which constitutes a support platform 14. This platform could be comprised of structural cross braces (not shown) but this would add extra weight and cost where a material securely fastened to the bottom frame 12 would function just as well.

The cart also includes a chair hanger 16 suitable for hanging folding chairs 18 thereon. The chairs 18 hang with their center of gravity below the hanger 16 thereby keeping the chairs 18 in stable equilibrium thereby preventing them from falling off the hanger 16 when the cart is traversing rough terrain.

The cart has an upper frame 20, which is comprised of a pair of side rails that support a receptacle 22, shown here in the form of a bag. This receptacle 22 could be made from a similar material as the support platform 14, in that a mesh material is preferable. The pliable nature of the material is useful in that it can collapse when the cart is folded into the collapsed configuration, as will be further disclosed.

A handle 24 is used to grasp by the user, tilt the cart back on the wheels 26, the axial 28 being mounted to the lower frame 12, and push or pull the cart as needed. The wheels 26 are of sufficient width to allow the cart to be pulled over even soft sand when the device is loaded. The wheels are also smooth annularly, treadless, thereby minimizing the work of displacement of the sand when the cart is traveling over same. A lugged or distorted annular surface increases the rolling friction of the wheel on the sand which is undesirable because the cart is not driven through the wheels 26 but by the handle 24.

Figure 2:
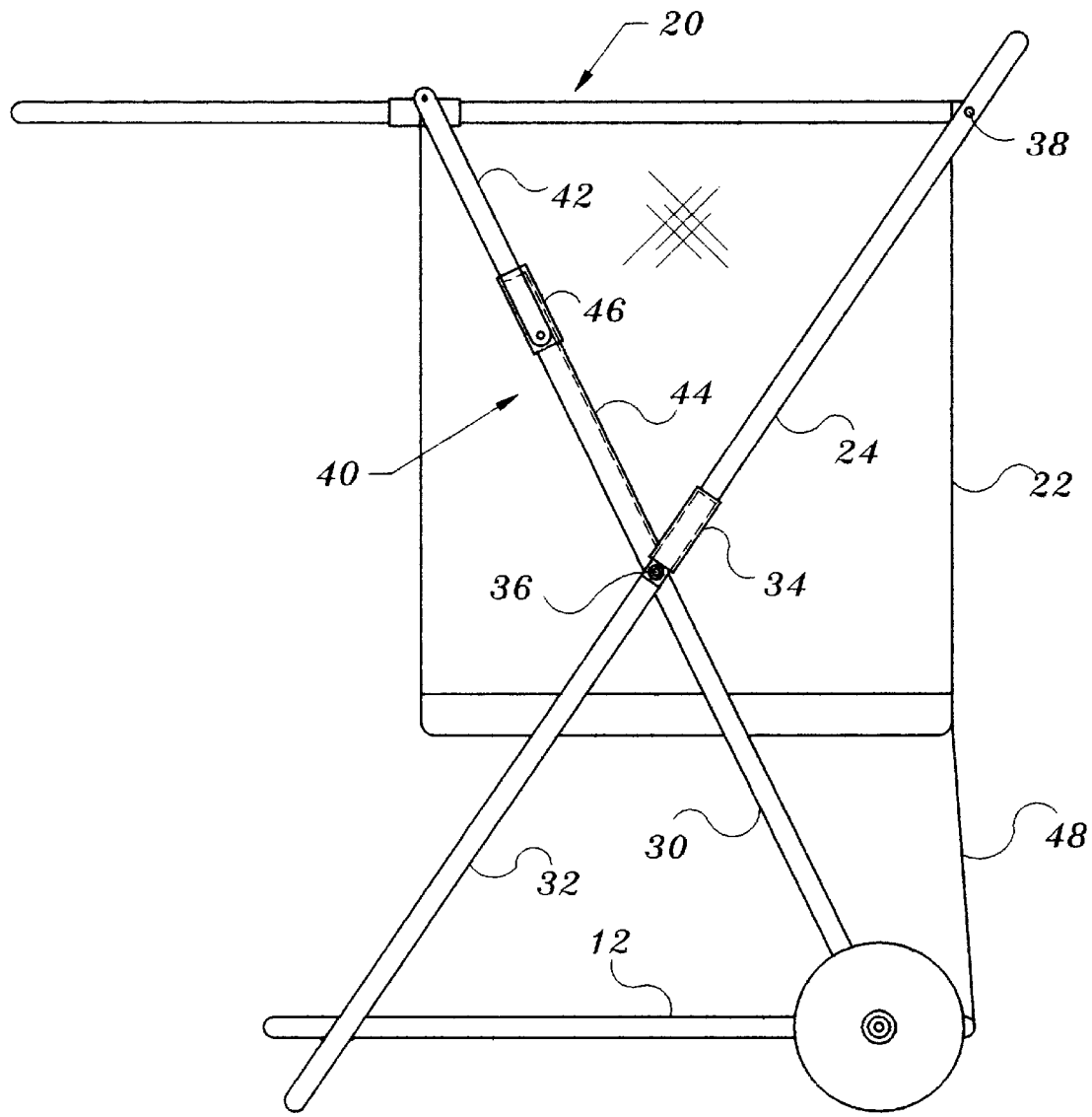
FIG. 2 is a side view of a collapsible cart produced in accordance with the preferred embodiment of the present invention.

A side view of the cart is shown in FIG. 2, which further discloses the preferred embodiment of an X-type frame, which allows structural support and maximal collapsibility of the cart. The lower frame 12 and upper frame 20 are supported by a rear leg 30, a front leg 32, which is removably secured to the handle 24 by use of a handle locking means 34. Here the handle locking means 34 is shown to slide on the handle 24 and receive the end of the front leg 32 securing one to the other when they are pivotally rotated in alignment around a pin 36. The upper frame 20 is pivotally attached to the handle 24 by an upper pin 38 and further supported by a frame gusset 40.

To further accommodate the collapsible nature of the cart the frame gusset 40 is shown here to be comprised of an upper gusset 42, pivotally attached to the upper frame 20, a lower gusset 44, pivotally attached to the handle 24 and a gusset lock 46 capable of locking and unlocking the upper gusset 42 and the lower gusset 44 in a secured position. Here the upper gusset 42 and the lower gusset 44 are pivotally attached and the gusset lock 46 is slidably mounted on the upper gusset 42 enabling the lock to engage the lower gusset 44 as well when both gussets are aligned with respect to each other.

The receptacle 22 is shown here to be prevented from excessive displacement by the back support 48 which is fastened to the bottom edge of the receptacle 22 and the rear of the bottom frame 12. The back support 48 has multiple functions in that it acts to prevent a large item located on the bottom frame 12 (such as an ice chest) from sliding out the back of the cart when the cart is tilted back, as it would be when in use. When the cart is in this in use position as shown, the back support 48 is tensioned along with the back of the receptacle 22 which is attached to the back of the side rails 21 of the upper supports 20. This tension adds structural rigidity to the frame, making it more stable by providing tension between the bottom frame 12 and the receptacle 22, as shown here. The preferred embodiment would possibly not have the bottom frame extending beyond the back of the wheel, as shown here, but is here to graphically depict the attachment of the back support 48 to the bottom frame 12. Dimensional adjustments such as these are considered to fall within the scope of the disclosure.

Figure 3:
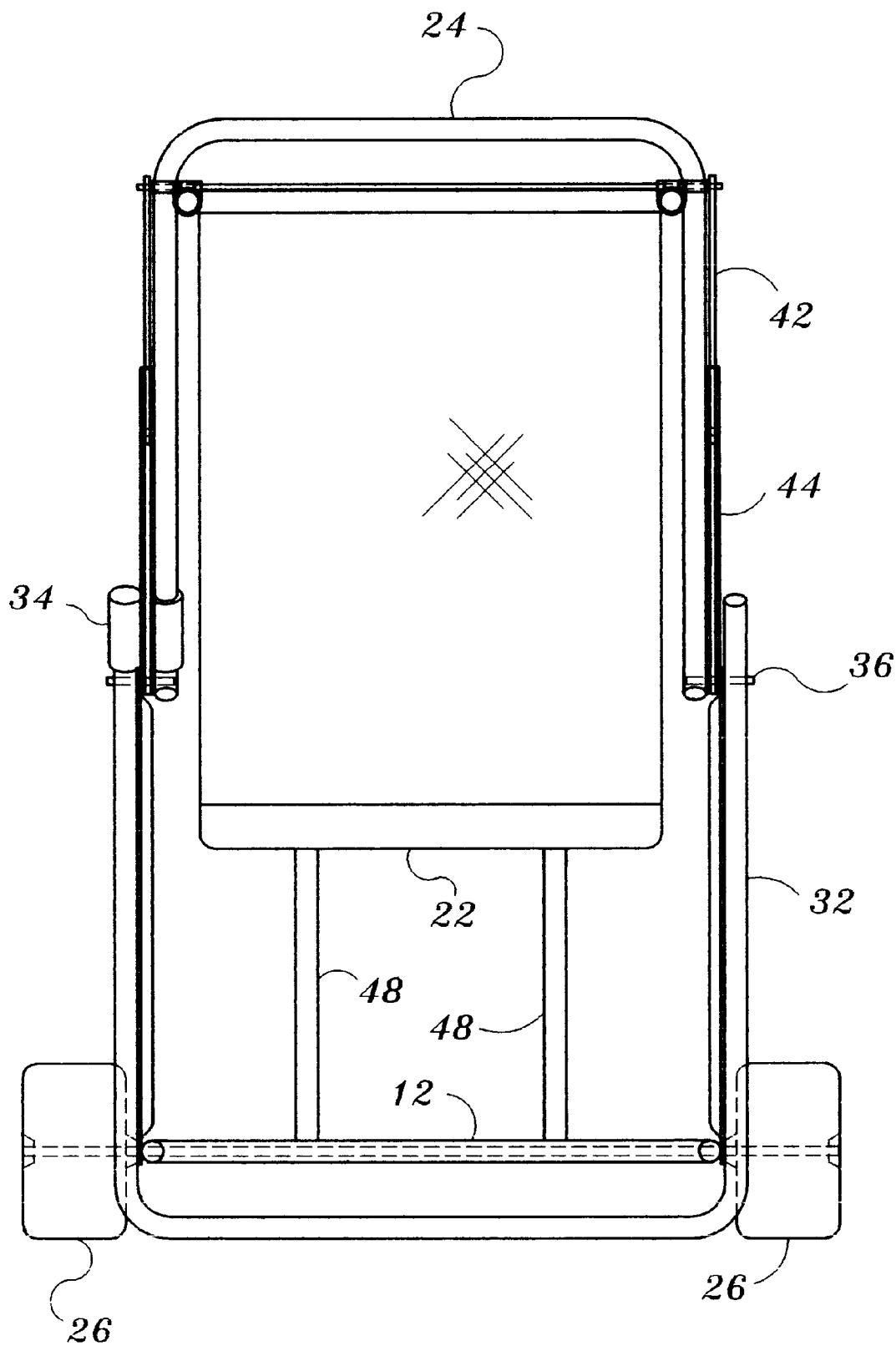
FIG. 3 is a front view of a collapsible cart produced in accordance with the preferred embodiment of the present invention.

The cart is further shown in the front view as depicted in FIG. 3. Here the upper gusset 42 and the lower gusset 44 are shown to be positioned as a spacer between the handle 24 and the front leg 32. The pin 36 is shown here to attach the gusset 44, the handle 24 and the front leg 32. The gusset 44 does not necessitate attachment here but is suggested by efficiency of manufacturing. The handle locking means 34 has been removed from one side to show detail. The back support 48 is shown here to be two parallel strips connecting the receptacle 22 to the bottom frame 12. The preferred embodiment would suggest these strips be manufactured of a cloth webbing such as cotton or nylon, but the material, number of strips and configuration are not critical to the novelty of the invention. As such, all combinations are considered obvious and therefore not further disclosed.

Figure 4:
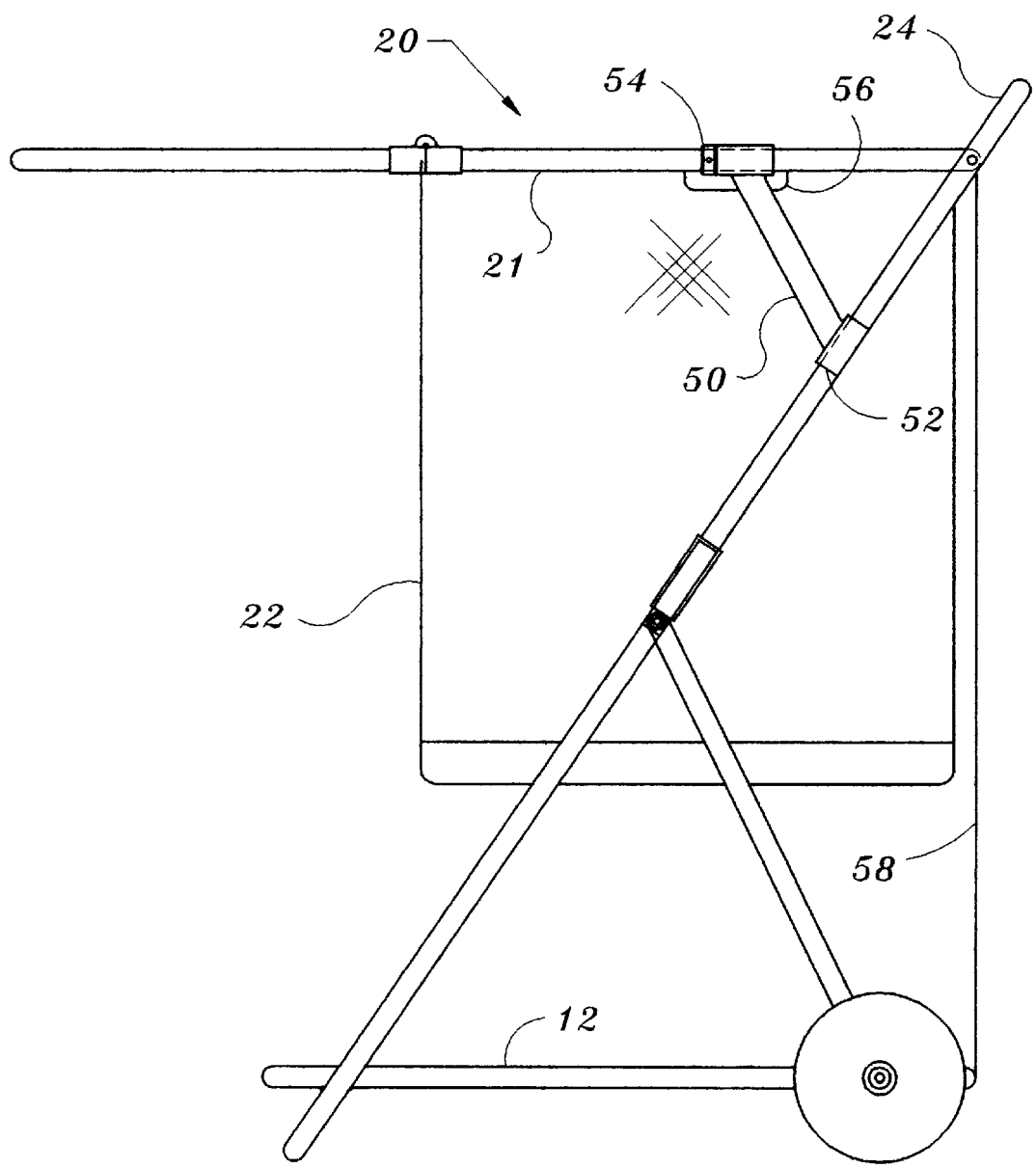
FIG. 4 is a side view of a collapsible cart showing an alternative frame gusset, the cart produced in accordance with the preferred embodiment of the present invention.

What is shown in FIG. 4 is a modification to the preferred embodiment specifically regarding the frame gusset 40 in FIG. 3. FIG. 4 shows the same upper frame 20 being supported from the handle 24, only here by use of a rigid gusset 50. Here the rigid gusset 50 is rotateably mounted to the side rails 21 of the upper frame 20. The other end of the rigid gusset 50 is in the form of a clip 52, which is removably received by the handle 24, thereby allowing rigid support and the ability to remove the structure for disassembly. A retaining ring 54 is secured to the side rail 21 to prevent forward movement of the gusset 50 when the upper frame 20 is loaded. The receptacle 22 includes a cutout 56 to allow the gusset 50 to be mounted on the side rail 21. The invention would work equally well with the gusset 50 rotatably mounted on the handle 24 with the clip 52 on the side rail 21 of the upper frame 20 or to have both ends of the gusset 50 removably attach onto their respective structures such as with the clip 52.

Also in FIG. 4 is shown an alternative to the back support 48 (as shown in FIG. 3). Here the long support 58 spans the distance from the lower frame 12 to the upper frame 20, running parallel to the vertical portion of the receptacle 22. As with the previous method, the long support 58 limits the movement of the receptacle 22, secures items on the lower frame 12 when same is in a tilted back position, and adds rigidity to the cart through tension in the support 58 between the frame members.

Figure 5:
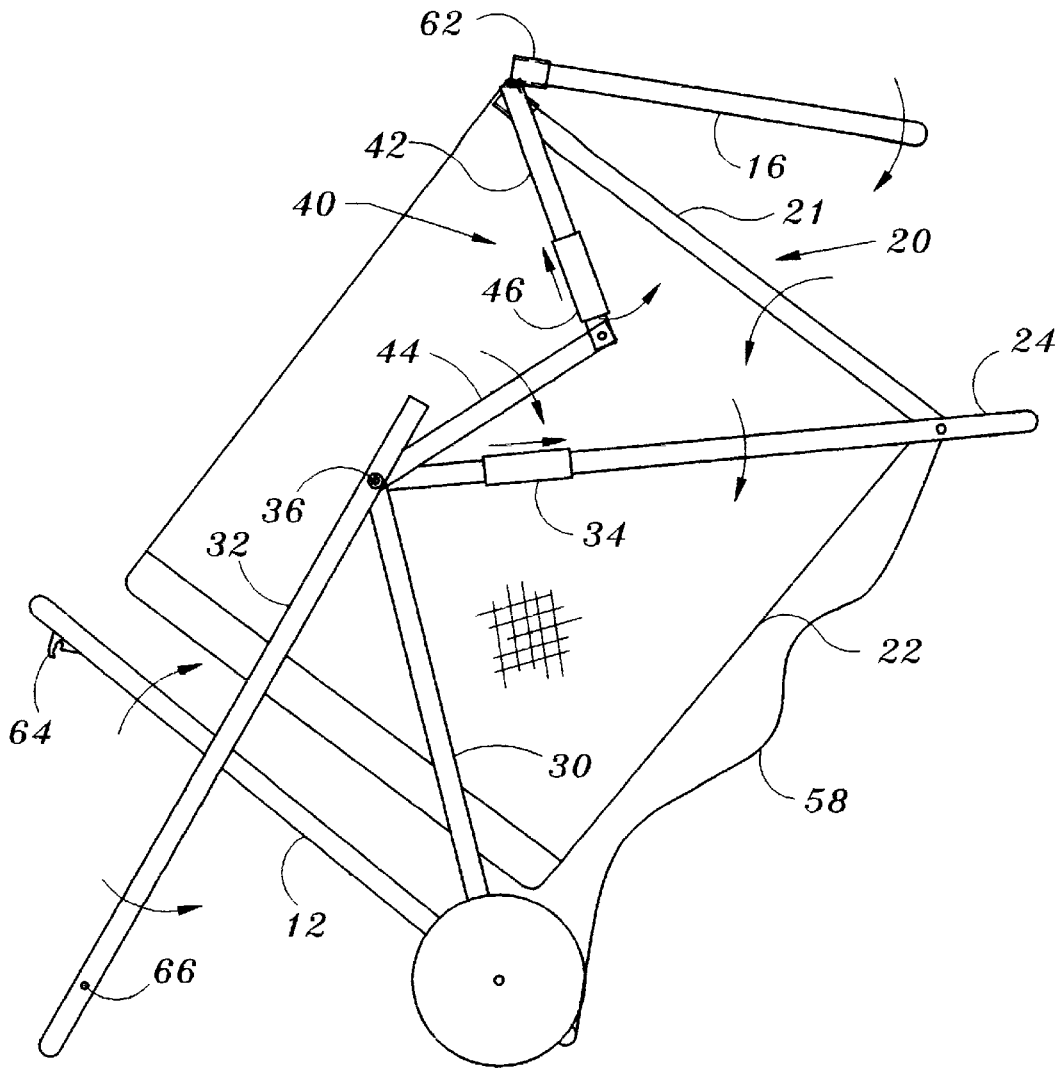
FIG. 5 is a side view of a collapsible cart being broken down, thereby showing the folding feature, the cart produced in accordance with the preferred embodiment of the present invention.

The collapsibility of the device is vitally important in the usefulness as it pertains to storage and transporting to where it is to be used. The smaller the space the device takes up when not in use the better. FIG. 5 shows the cart as all members would be collapsed to fold up. Arrows show the direction of rotation of the components as well as movement to disengage the respective locks. The chair hanger 16 is rotated back onto the upper frame 20 by use of a pair of pivoting caps 62, one cap on the end of the side rail 21 of the upper frame 20 and the other on the end of the chair hanger 16, both having a common axis to pivot thereon. The rigid gusset (on FIG. 4) would be disengaged or, as shown here, the gusset lock 46 slid up to unlock the frame gusset 40 allowing the upper gusset 42 to rotate toward the upper frame 20 and the lower gusset 44 to rotate toward the handle 24. Due to the pivotal attachment of the upper gusset 42 to the lower gusset 44, their respective movement can only happen providing the upper frame 20 rotates down toward the handle 24. This entire assembly is now free to rotate around the pin 36 toward the rear leg 30 after disengagement of the handle locking means 34 from the front leg 32 by sliding it on the handle 24 away from the front leg 32.

The upward movement of the lower frame 12 reveals a lower locking means 64 which is fastened to the bottom of the lower frame 12 and receives a locking pin 66 which is mounted to the inside of the front leg 32. This locking means combination secures the bottom frame to the front leg as well as further stabilizes the entire structure in its assembled state. When the lower locking means 64 is disengaged from the locking pin 66 the lower frame 12 and the front leg 32 are able to also rotate toward the rear leg 30, the receptacle 22 and the long support 58 both being of a pliable material, thereby the whole structure folding into a collapsed state.

Figure 6:
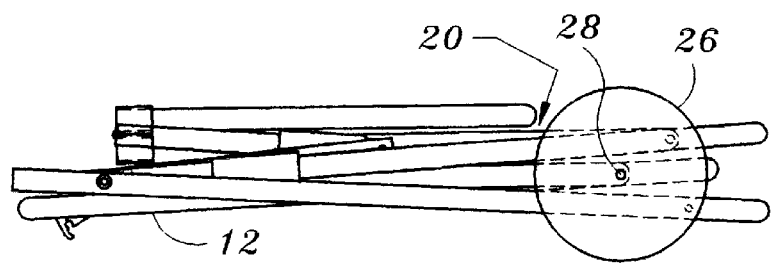
FIG. 6 is a side view of a collapsible cart when folded, the cart produced in accordance with the preferred embodiment of the present invention.

The final collapsed state of the cart is shown in FIG. 6. The receptacle is not shown in that it would be collapsed between the upper frame 20 and the lower frame 12. The wheels 26 can remain on the axial 28 but also can be removed if even more reduced storage space is required. Though the preferred embodiment does not include the removal of the wheels 26, the inventors acknowledge the potential usefulness of such a feature and therefore reserve the right to include such a feature as being disclosed herein.

Figure 7:
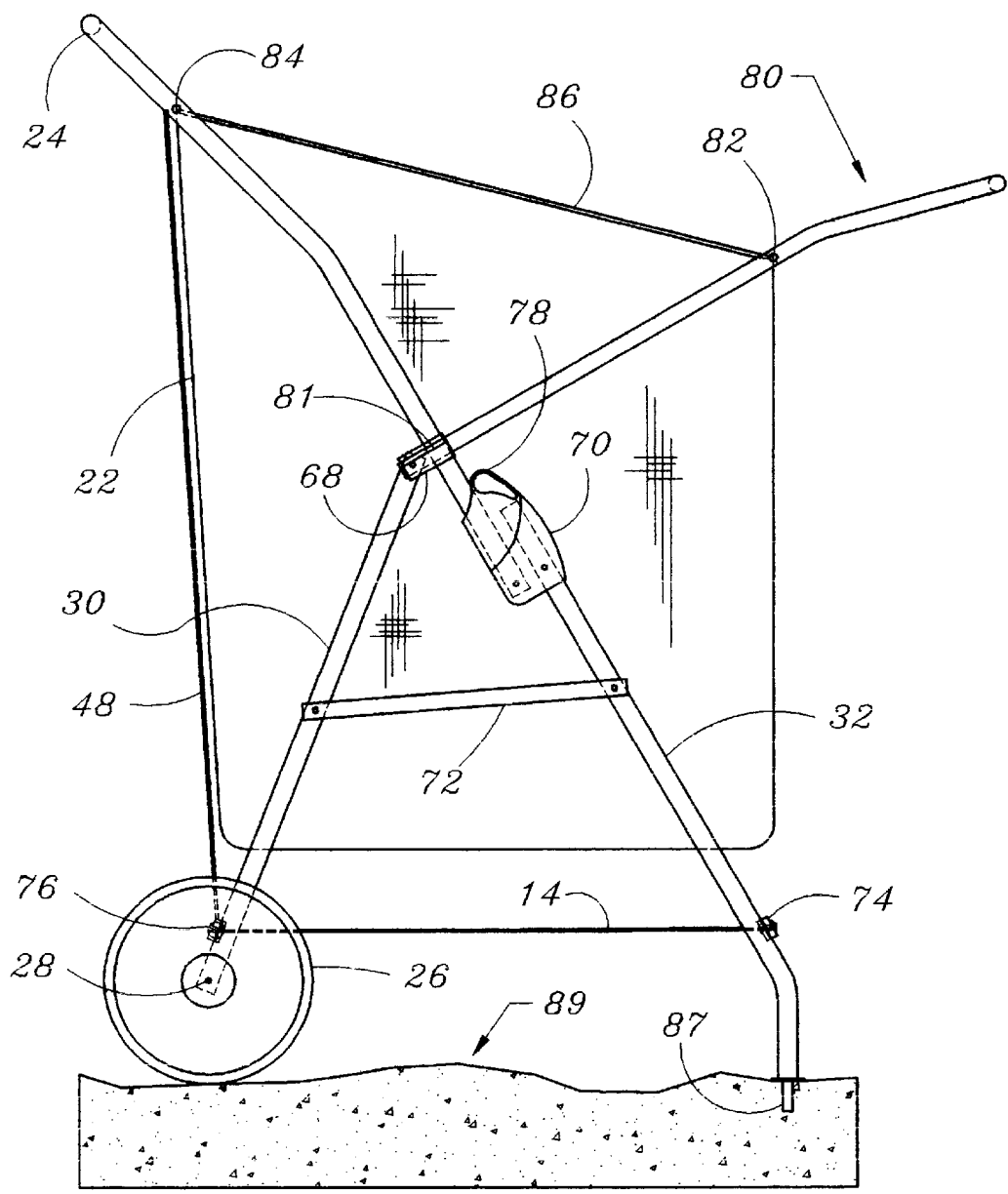
FIG. 7 is a side view of a collapsible cart produced in accordance with an alternative to the preferred embodiment of the present invention.

An alternative to the preferred body is further disclosed in FIG. 7. Here the cart is identical in function and its ability to fold into a compact unit but the frame varies slightly in design. This embodiment is consistent with the previous, in that the rear leg 30 supports an axle 28 on which a pair of wheels 26 are pivotally mounted. A modification exists in that the upper end of the rear leg 30 is pivotally attached to a main bracket 68, the bracket being secured to the mid to lower portion of the handle 24. The handle 24 makes up the upper rear position of the "X-type" frame. The lowest portion of the handle 24 is pivotally attached to a stop bracket 70, which is in turn secured to the upper portion of the front leg 32. The front leg 32 and the rear leg 30 are further connected by a brace 72 which is pivotally mounted at the mid portions of the front and rear legs. The brace 72 provides added stability to the device and also ensures proper positioning of the front and rear legs when the invention is in a collapsed position.

The bottom portion of the front leg 32 includes a front cross member 74 and the rear leg 30 supports a rear cross member 76. These cross members support the ends of the support platform 14, the difference from the previous being the bottom frame has been eliminated, thus allowing the platform, being made of a pliable material, to collapse when the invention is folded.

A single locking mechanism is now used to take the invention from a collapsed or folded condition to a locked and functional position. Here the slide lock 78 is slidably mounted on the lower portion of the handle 24 and being capable of receiving the upper end of the front leg 32. When in the locked position, the handle 24 and the front leg 32 are locked in a fixed position, one to the other, typically in a parallel configuration. The brace 72, being rigid, causes a predetermined positioning of the front and rear cross members (74 and 76 respectively), making the material of the support platform 14 to be made tight, and therefore capable of holding items such as those disclosed earlier.

Finally, the chair hanger 16 (as depicted in FIG. 1) is now a hanger gusset 80. The hanger gusset 80 constitutes a front, upper portion of the "X-type" frame. The hanger gusset 80 is pivotally mounted to the main bracket 68 at a position near the handle 24. The main bracket 68 includes a lock 81 in the form of a clip that secures the hanger gusset 80 in an extended position but allows same to disengage and fold as depicted later in this disclosure.

Toward the distal end of the hanger gusset 80, is a front cross bar 82 which functions in conjunction with a rear cross bar 84 located near the upper end of the handle 24. The front and rear cross bars support the front and rear of the receptacle 22 in addition to a pair of collapsible side rails 86, one on each side of the invention, each connecting the front and rear cross bar. The collapsible side rails 86 are constructed of a resilient material with a high tensile strength, such as cotton, polyester, nylon, other thermoplastics, synthetic rubber and natural rubber, similar to the receptacle 22. When the hanger gusset 80 is put in the extended position the collapsible side rails 86 are made tight, thereby creating structural support for the sides of the receptacle 22.

The far end of the hanger gusset 80 is a structure capable of supporting one or more chairs, such as folding chairs or beach chairs, for transport thereon. The added weight of the chairs helps to maintain the top of the receptacle 22 in an open position. The collapsible feature of the side rails 86 are necessary when folding of the invention into a collapsed structure. The lower end of the front leg 32 includes a stabilizer 87 which is capable of penetrating the yielding terrain 89 depicted here as sand or soft soil, thereby holding the invention in place when it is intended to be stationary.

Figure 8:
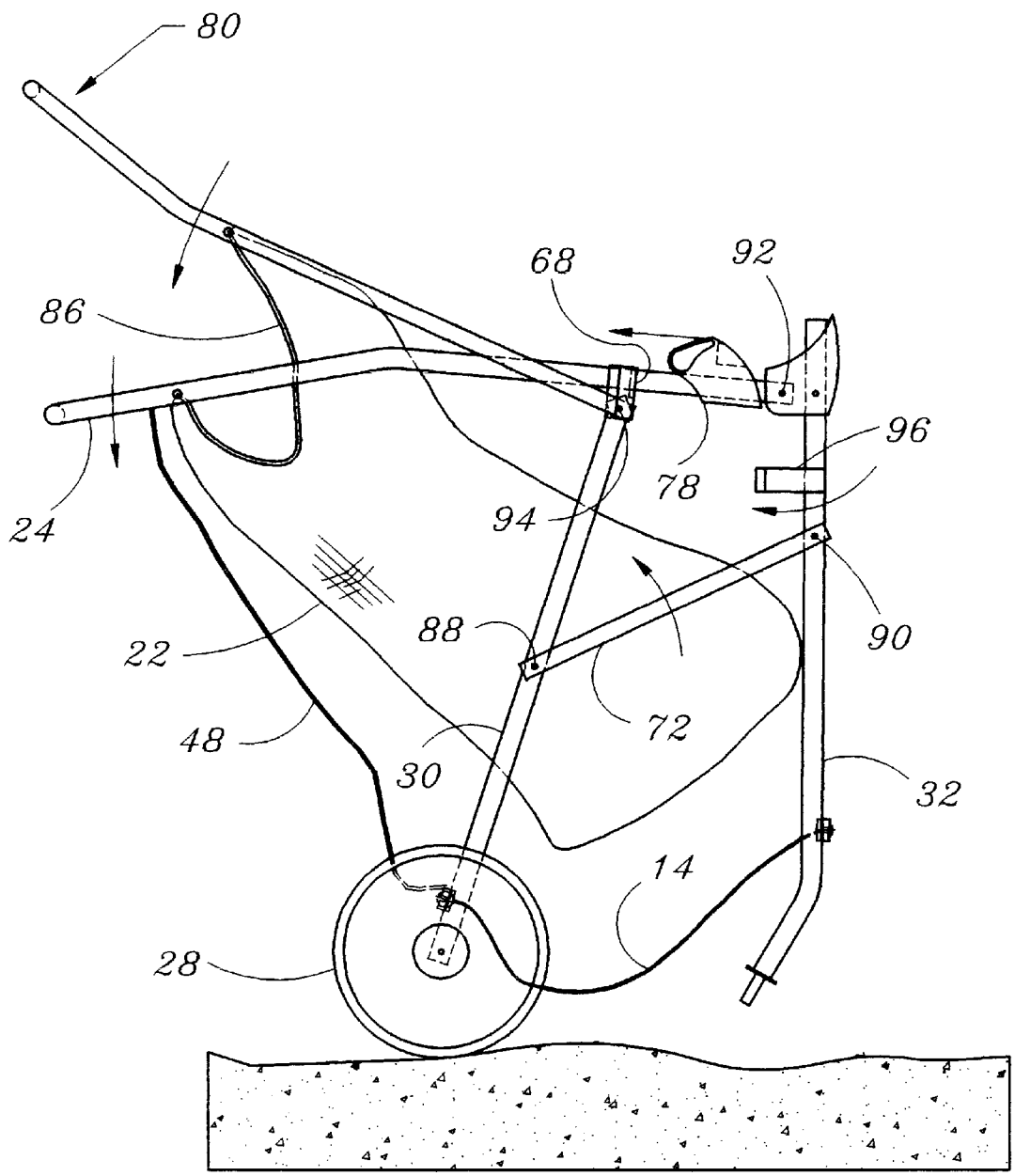
FIG. 8 is a side view of a collapsible cart being broken down, the cart produced in accordance with an alternative to the preferred embodiment of the present invention.

The alternative preferred embodiment as shown in FIG. 7 is shown in the process of being collapsed or folded in FIG. 8. The folded size of the invention is similar to that as shown in FIG. 6, with the process of folding shown here in detail in FIG. 8. Designating a stationary piece as that of rear leg 30, relative to that the brace 72 rotates up about the rear pivot 88. This is able to be done only after unlocking the structure by moving the slide lock 78 up the handle 24 to allow the distal end of the front tube 32 to be disengaged from the slide lock 78. The front pivot 90 allows clockwise movement of the brace 72 which provides counter clockwise rotation of the front leg 32 about the leg pivot 92. As shown here, the support platform 14 folds onto itself in a collapsed state.

The hanger gusset 80 rotates back onto the handle 24 about the gusset pivot 94 collapsing the side rails 86 as it goes. The receptacle 22, also being manufactured of a pliable material such as cotton, polyester, nylon, other thermoplastics, synthetic rubber and natural rubber, folds onto itself. The handle 24 with the main bracket 68 fixed thereto and all adjoining components rotate counterclockwise about the gusset pivot 94 until the handle 24 is located near the wheel 28. This folds the entire structure into a compact unit capable for easy storage.

The invention may also include a frame lock 96 that provides the capability of releaseably securing the front leg 32 and the handle 24 in close proximity one to another. This can be done by a number of methods including spring material such as steel or plastic that flexes to allow one or more of the members of the structure to pass and be secured thereby. To unlock, the frame lock 96 is flexed to allow movement of the structural member to pass by, unfolding the invention so that it can be used.

What is claimed is:

1. A collapsible cart comprising:
    a structural frame, the frame comprising:
        at least one rear leg with a means for directly supporting a wheel disposed at one end thereof;
        at least one front leg directly pivotally connected to a first end of a brace, and a second end of said brace being directly pivotally connected to said rear leg;
        a handle including at least one longitudinal portion that is pivotally connected to said front leg near the distal end of each longitudinal portion, the handle also being pivotally connected to said rear leg opposite to said means for directly supporting a wheel;
    at least one wheel rotatably mounted to said means for supporting a wheel;
    a locking means capable of releasably securing said handle to said at least one front;
    leg, said locking means and said handle being in a predetermined relationship with each other when the locking means is locked;
    a hanger gusset being pivotally mounted to said structural frame, the hanger gusset being capable of being positioned away from said handle; and
    a receptacle fastened to said structural frame and said hanger gusset, thus providing a means of receiving items placed therein, whereby when said at least one front leg and said handle are secured one to another in a distended position, said at least one rear leg being positioned away from said at least one front leg by said brace, and said hanger gusset is pivotally displaced from said handle, thereby placing said receptacle in an open position, the combination being suitable for accommodating and transporting objects over terrain consistent with the soft sand of a beach, and when empty, the combination can be folded such that the handle, front leg, hanger gusset, brace and rear leg can be pivotally manipulated to be in close proximity to one other, thereby collapsing into a minimal space for easy and convenient storage.

2. The collapsible cart as described in claim 1, further comprising a support platform constructed of a pliable material, the platform including one end that is fixably attached to said at least one rear leg and the opposite end being attached to said at least one front leg, whereby when said legs are positioned away from one another a surface is created which is capable of supporting an item such as an ice chest.

3. The collapsible cart as described in claim 2, further comprising a front cross member attached to said at least one front leg and a rear cross member attached to said at least one rear leg, the cross members providing a rigid structure with which to attach said platform.

4. The collapsible cart as described in claims 2, further comprising a back support which connects said handle and said at least one rear leg, thereby preventing objects positioned within the receptacle and on said support platform from being dislodged off the rear of the cart.

5. The collapsible cart as described in claim 1, further comprising a front cross bar attached to said hanger gusset and a rear cross bar attached to said handle, the cross bars providing a rigid structure with which to attach said receptacle.

6. The collapsible cart as described in claim 5, further comprising side rails along the upper opening of said receptacle, thus providing increased support of said receptacle while in an open position and collapsible to allow said receptacle to fold into a collapsed state.

7. The collapsible cart as described in claim 6, wherein said side rails are comprised of a pair of side rails, one on each side of said cart, located between said handle and said hanger gusset, and is constructed of a pliable material, whereby said side rails add structural support to said receptacle while in an open position and deform when said receptacle is in a collapsed state.

* * * * *